United States Patent Office

3,536,746
Patented Oct. 27, 1970

3,536,746
PREPARATION OF 7-CHLORO-4-THIA-OENANTHIC ACID
Jozef A. Thoma, Sittard, and Werner Reichrath, Geleen, Netherlands, assignors to Stamicarbon N.V., Heerlen, Netherlands
No Drawing. Filed May 9, 1967, Ser. No. 637,081
Claims priority, application Netherlands, May 11, 1966, 6606402
Int. Cl. C07c 121/00
U.S. Cl. 260—465.7               5 Claims

ABSTRACT OF THE DISCLOSURE

A process is described for preparing 7-chloro-4-thia-oenanthic acid by reacting beta-mercaptopropionic acid (or the corresponding nitrile, ester or salt) and allyl chloride in the presence of a non-oxidative free-radical catalyst.

BACKGROUND OF THE INVENTION

The present invention relates to the preparation of the novel compound: 7-chloro-4-thia-oenanthic acid. This new compound is a useful starting material for the preparation of other compounds, for instance, 7-amino-4-thia-oenanthic acid, which is useful an an amino acid in various chemical processes, and also as an antioxidant, and its derivatives (nitrile and alkaline earth metal salts) are useful as surface active agents.

It has been proposed in U.S. patent application No. 555,987 filed June 8, 1966 now U.S. Pat. 3,476,664, to prepare 7-chloro-4-thia-oenanthic acid by reacting beta-mercaptopropionic acid (or a derivative thereof, such as the nitrile, an ester or a salt) in a solvent with allyl chloride, under ultraviolet irradiation. The compound 7-chloro-4-thia-oenanthic acid can be recovered directly from the resulting reaction product, or, if the nitrile, ester, or salt has been used, after first converting the same to the carboxylic acid by conventional methods.

SUMMARY OF THE INVENTION

It has now been found that this reaction can be advantageously conducted without using ultraviolet irradiation if certain free radical-forming catalysts are employed.

DESCRIPTION OF THE INVENTION

This invention thus provides a process for the preparation of 7-chloro-4-thia-oenanthic acid wherein betamercaptopropionic acid (or the nitrile or an ester or salt of beta-mercaptopropionic acid) is reacted with allyl chloride, at a temperature of 15–150° C. and in the presence of a solvent, by adding a non-oxidative substance which will form free radicals at the reaction temperature. The 7-chloro-4-thia-oenanthic acid can then be recovered from the resulting reaction product either directly or, if nitrile or ester or salt has been used, after conversion thereof, by known methods, to the free acid.

In conducting the reaction, no special measures with regard to the pressure are necessary, since at atmospheric pressure the reaction can generally be carried out satisfactorily at a temperature below the boiling point of the solvent employed.

A suitable reaction tempreature is in the range of about 15–150° C., within which temperature range the free radical-forming catalysts will decompose, giving rise to the formation of free-radicals.

Various free-radical catalysts may be used which are non-oxidative substances. Compounds promoting oxidation, e.g. hydroperoxides, peroxides, persulfates, and other oxidative percompounds, give rise to the formation of undesired products and are therefore not to be used.

Examples of suitable non-oxidative free-radical forming catalysts include the azonitriles (e.g. azo-bisisobutyronitrile, 1-azo-biscyclopentanonitrile) and other azo-compounds (such as phenylazotriphenyl methane) as well as certain hydrazines, e.g. tetraphenyl hydrazine.

An amount of about 0.1 to 2 mol percent of the free-radical forming catalyst, with respect to the quantity of allyl chloride contained in the reaction mixture, is sufficient for the practice of this invention.

In the reaction carried out in accordance with the invention it is believed that addition of the beta-mercaptopropionic acid (or of the ester, or salt, or the nitrile thereof) to allyl chloride takes place. In this reaction, it is not necessary to employ an excess of any of the starting materials, and usually, the reaction is conducted with essentially equimolecular amounts (however, there may be an imbalance in the reaction between the two reactants which will mean that unreacted excess of one reactant will be left over).

A further feature of this invention resides in the additional procedure of conducting the reaction in an inert atmosphere. By this technique, the reaction is found to be promoted and the formation of undesired by-products is suppressed. This feature can be realized simply by passing a stream of hydrogen or nitrogen through the liquid reaction mixture. The amount of gas may be varied widely as desired, and may, for instance, be only as much as 0.1–5 moles of hydrogen or nitrogen per mole of allyl chloride.

In conducting the reaction, a solvent is used. Suitable solvents include liquid aromatic hydrocarbons, e.g. benzene, and such polar solvents as ordinary alkyl alcohols. The amount of solvent may also be widely varied. Usually, the amount, by weight, of the solvent is about equal to the amount by weight of the starting materials, so that the reaction mixture will contain about 50% by weight of solvent. However, this invention is not limited to a specific solvent amount.

If use is made of a salt of beta-mercaptopropionic acid, for instance an alkali metal salt, the corresponding salt of 7-chloro-4-thia-oenanthic acid is formed. Such a salt can be converted to 7-chloro-4-thia-oenanthic acid by a treatment with an equivalent amount of acid.

If use is made of the nitrile of beta-mercaptopropionic acid, the product of the addition reaction is 7-chloro-4-thia-oenanthonitrile. This compound, which has not been known until now, can then be converted to 7-chloro-4-thia-oenanthic acid by known hydrolysis methods; usually this is done by a treatment with an acid.

The esters of beta-mercaptopropionic acid that can be used as starting materials may be chosen from the group of lower alkyl, cycloalkyl and benzenoid aromatic esters. Examples of suitable esters are, for instance, methyl, ethyl, isopropyl, butyl, cyclohexyl and phenyl esters of beta-mercaptopropionic acid. If an ester is used, the product of the addition reaction is the corresponding ester of 7-chloro-4-thia-oenanthic acid. The ester can be converted to 7-chloro-4-thia-oenanthic acid by hydrolysis by means of an acid. It is preferred in this hydrolysis to remove the resulting alcohol during the hydrolysis, e.g. by distillation, to assist progress of the hydrolysis reaction.

If the addition reaction is carried out with beta-mercaptopropionic acid using an alcohol as the solvent, some esterification may take place. In working up the reaction product, allowance should then be made for the presence of the ester.

The recovery of the 7-chloro-4-thia-oenanthic acid, which is a liquid at room temperature from the reaction product may be achieved in a known manner, e.g. by distillation.

By means of a reaction with ammonia the 7-chloro-4-thia-oenanthic acid can then be converted into 7-amino-4-thia-oenanthic acid. This reaction is usually carried out at elevated pressure, e.g. at about 30—70 atm., and at a temperature of 50–100° C.

EXAMPLE I

In a reaction vessel having a capacity of ½ litre and equipped with a stirrer, 38.2 g. of allyl chloride (0.5 mole) is dissolved in 80 ml. of benzene, after which 52 g. of beta-mercaptopropionic acid and 0.5 g. of azo-bisisobutyronitrile are added. The reaction mixture is heated for 30 minutes at a temperature of 75—80° C., while a stream of nitrogen (5 litres/hr., measured at 0° C. and 1 atm.) is being passed through.

Thereafter the benzene solvent is removed by distillation and the residue is vacuum distilled.

The yield is 75 g. of 7-chloro-4-thia-oenanthic acid (boiling point 145° C. at 1.5 mm. Hg), corresponding to an efficiency of 82%.

EXAMPLE II

The experiment described in Example I is repeated, with the difference that the reaction residue is dissolved in 400 ml. of 1.2-dichloroethane after the removal of the benzene by distillation.

After addition of 119 g. of thionyl chloride, the solution is boiled for 1½ hr. with reflux cooling. The 1.2-dichloroethane is then distilled off, and the resulting residue distilled further under vacuum to obtain the acid chloride of 7-chloro-4-thia-oenanthic acid (boiling point 99° C. at 0.8 mm. Hg).

This acid chloride is then heated for 1 hour in 300 ml. of boiling water, after which the acid residue is recovered by evaporation and drying.

The yield obtained is 72 g. of 7-chloro-4-thia-oenanthic acid (efficiency 79%).

EXAMPLE III

In a reaction vessel having a capacity of ½ litre and equipped with a stirrer 38.2 g. of allyl chloride (0.5 mole) is dissolved in 80 ml. of ethanol, after which 67 g. of the ethyl ester of beta-mercaptopropionic acid is added. After addition of 1 g. of tetraphenyl hydrazine the reaction mixture is heated for 50 min. at a temperature of 65–70° C.

Thereafter the ethanol solvent is removed by distillation, and the residue is vacuum distilled to provide 85 g. of the ethyl ester of 7-chloro-4-thia-oenanthic acid (boiling point 118° C. at 1.5 mm. Hg) (efficiency 80).

52.6 g. of the resulting ester is run into 250 ml. of concentrated hydrochloric acid, and this mixture is boiled for ½ hr. with reflux cooling. After drying by evaporation, the residue is again run into 250 ml. of hydrochloric acid, followed by boiling for ½ hr. After drying by evaporation the same treatment with hydrochloric acid is once more repeated.

The yield is 41 g. of 7-chloro-4-thia-oenanthic acid (efficiency 90% with respect to the ester).

EXAMPLE IV

In a reaction vessel having a capacity of ½ litre and equipped with a stirrer, 38.2 g. of allyl chloride (0.5 mole) is dissolved in 100 ml. of toluene, after which 43.5 g. of beta-mercaptopropionitrile (0.5 mole) is added. After addition of 1 g. of azo-bisisobutyronitrile the reaction mixture is heated for 45 minutes at a temperature of 66–68° C.

Thereafter the toluene solvent is removed by distillation, and subsequently by vacuum distillation 68 g. of the nitrile of 7-chloro-4-thia-oenanthic acid (boiling point 115° C. at 1.5 mm. Hg) is obtained (efficiency 82%).

41 g. of the resulting nitrile is run into 250 ml. of concentrated hydrochloric acid, and the mixture is boiled for 1 hour with reflux cooling, followed by drying by evaporation. To separate out the ammonium chloride formed in the residue, the product is extracted with ether, which ether solution is subsequently evaporated leaving a residue of 41 g. of 7-chloro-4-thia-oenanthic acid (efficiency 90%).

What is claimed is:

1. Process for the preparation of addition products of allyl chloride and a mercapto-compound selected from the group consisting of β-mercaptopropionic acid, β-mercaptopropionitrile, a lower hydrocarbyl ester of β-mercaptopropionic acid, the hydrocarbyl radical of which contains less than 7 carbon atoms and is selected from the group consisting of a lower alkyl up to 4 carbon atoms, cyclohexyl and phenyl, and an alkali metal salt of β-mercaptopropionic acid, comprising reacting the mercapto compound with allyl chloride, at a temperature between 15 and 150° C. and in the presence of an inert solvent and a catalytic amount of a radical forming compound selected from the group consisting of azo-bisisobutyronitrile, 1-azobiscyclopentanonitrile, phenylazotriphenyl methane and tetraphenyl hydrazine to form 7-chloro-4-thia-oenanthic acid from the β-mercaptopropionic acid, 7-chloro-4-thia-oenantho-nitrile from β-mercaptopropionitrile, the corresponding hydrocarbyl ester of 7-chloro-4-thia-oenanthic acid from the hydrocarbyl ester of β-mercaptopropionic acid and the corresponding alkali metal salt of 7-chloro-4-thia-oenanthic acid from the alkali metal salt of β-mercaptopropionic acid.

2. Process according to claim 1, characterized in that the free radical-forming catalyst used is azo-bisisobutyronitrile.

3. The process of claim 1, wherein the reaction is conducted under an inert atmosphere.

4. The process of claim 1, wherein the solvent is a liquid aromatic hydrocarbon.

5. The process of claim 1, wherein the said catalyst is used in an amount of about 0.1 to 2 mol percent of the quantity of allyl chloride present.

References Cited

UNITED STATES PATENTS 3,315,000   4/1967   Ransley _____ 260—609
3,361,808   2/1968   Ransley _____ 260—481 XR
3,376,348   4/1968   Stratton _____ 260—609
3,398,200   8/1968   Griesbaum et al. ____ 260—609

OTHER REFERENCES

Walling et al., J.A.C.S., vol. 81 (1959, pp. 1144 to 1148.

JOSEPH P. BRUST, Primary Examiner

U.S. Cl. X.R.

260—481, 539